United States Patent
Powers et al.

(10) Patent No.: US 11,277,262 B2
(45) Date of Patent: Mar. 15, 2022

(54) SYSTEM GENERATED DATA SET ENCRYPTION KEY

(71) Applicant: International Business Machines Corporation, Armonk, NY (US)

(72) Inventors: Eysha Shirrine Powers, Los Angeles, CA (US); Michael Joseph Jordan, Woodstock, NY (US); Cecilia Carranza Lewis, San Jose, CA (US); Eric David Rossman, Wappingers Falls, NY (US)

(73) Assignee: International Business machines Corporation, Armonk, NY (US)

( * ) Notice: Subject to any disclaimer, the term of this patent is extended or adjusted under 35 U.S.C. 154(b) by 0 days.

(21) Appl. No.: 16/918,298

(22) Filed: Jul. 1, 2020

(65) Prior Publication Data

US 2022/0006618 A1    Jan. 6, 2022

(51) Int. Cl.
*H04L 9/08*    (2006.01)
*G06F 21/60*    (2013.01)

(52) U.S. Cl.
CPC .......... *H04L 9/0822* (2013.01); *G06F 21/602* (2013.01)

(58) Field of Classification Search
CPC .............................. H04L 9/0822; G06F 21/602
See application file for complete search history.

(56) References Cited

U.S. PATENT DOCUMENTS

| | | | |
|---|---|---|---|
| 8,045,714 B2 | 10/2011 | Cross | |
| 8,190,921 B1 | 5/2012 | Harwood | |
| 8,370,648 B1 | 2/2013 | Natanzon | |
| 2016/0078244 A1 | 3/2016 | Bruso | |
| 2016/0277373 A1 | 9/2016 | Murray | |
| 2019/0230072 A1 | 7/2019 | Murray | |
| 2019/0318102 A1* | 10/2019 | Araya | H04L 9/0822 |
| 2021/0152336 A1* | 5/2021 | Seaborn | H04L 9/088 |

FOREIGN PATENT DOCUMENTS

CN    110870252 A    3/2020

OTHER PUBLICATIONS

Mell et al., "The NIST Definition of Cloud Computing", Recommendations of the National Institute of Standards and Technology, Special Publication 800-145, Sep. 2011, 7 pages.
International Search Report and Written Opinion dated Sep. 15, 2021 from International Application No. PCT/CN2021/102411 filed Jun. 25, 2021.

* cited by examiner

*Primary Examiner* — Abiy Getachew
(74) *Attorney, Agent, or Firm* — David K. Mattheis; Maeve M Carpenter

(57) ABSTRACT

Generating unique data encryption keys for a data set, by allocating a data set associated with a security policy, where the security policy specifies a key encryption key (KEK) label, retrieving the KEK label from the security policy, storing the KEK label as metadata of the data set, opening the data set for a first time write, generating a data encryption key (DEK), retrieving a KEK from a key store according to the KEK label, encrypting the DEK using the KEK, storing the encrypted DEK as metadata of the data set, and encrypting the data set using the DEK.

20 Claims, 7 Drawing Sheets

SYSTEM GENERATED DATA SET ENCRYPTION KEY

BACKGROUND

The disclosure relates generally to generating data encryption keys (DEKs). The disclosure relates particularly to system generated DEKs for files and data sets and enabling efficient rekeying of files and data sets. As used herein the term "data set" refers broadly to digital files and data sets.

Data encryption is an impactful way to reduce the risk of a data breach. Deploying an encryption strategy can be complex. For enterprise organizations, there is growing interest in using data set level encryption where the underlying operating system performs the encryption on behalf of each application without requiring application changes. Enterprise security architects deploying data set level encryption, on behalf of enterprise organizations, may have responsibility to determine new policies and procedures related to data encryption. For example, some security policies require that encrypted data be periodically re-encrypted with a new DEK.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable generating data encryption keys (DEKs) for data sets.

Aspects of the invention disclose methods, systems and computer readable media associated with improving the ability to generate unique data encryption keys for a data set, by allocating a data set associated with a security policy, where the security policy specifies a key encryption key (KEK) label, retrieving the KEK label from the security policy, storing the KEK label as metadata of the data set, opening the data set for a first time write, generating a data encryption key (DEK), retrieving a KEK from a key store according to the KEK label, encrypting the DEK using the KEK, storing the encrypted DEK as metadata of the data set, and encrypting the data set using the DEK.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
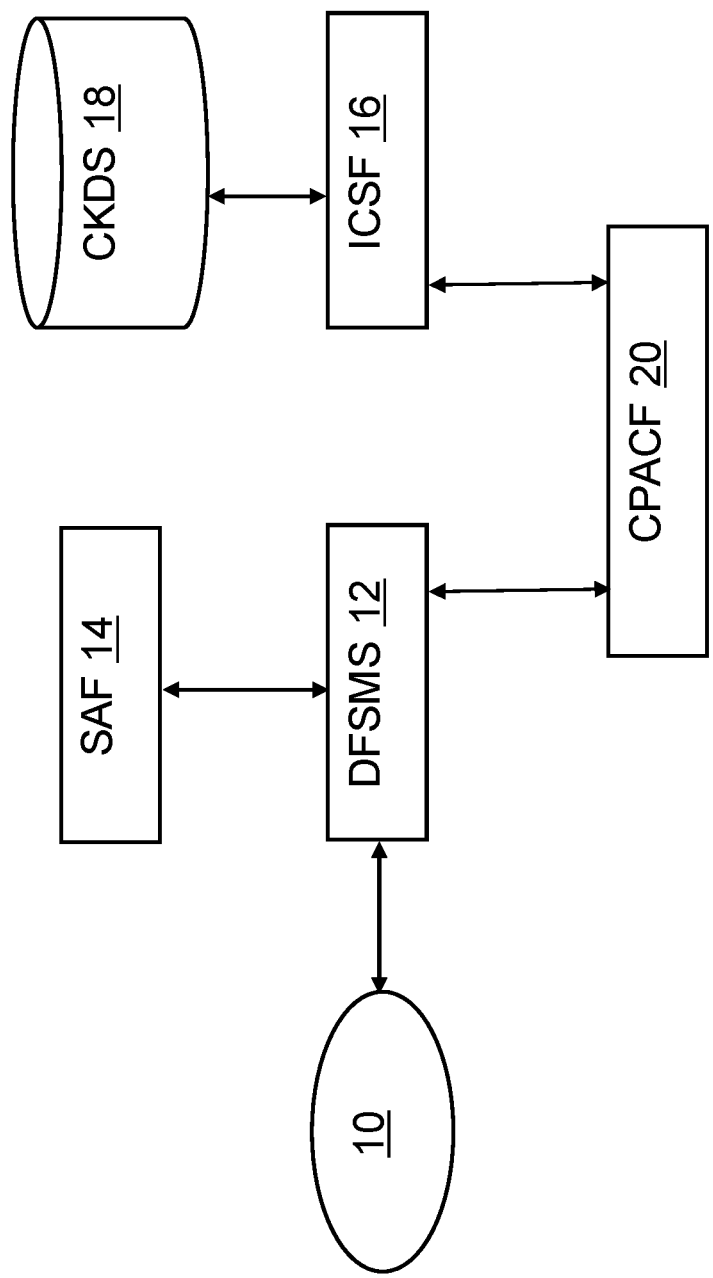
FIG. 1 provides a schematic illustration of a functional block diagram of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., opening an encrypted data set, validating the user's authorization to a KEK label, retrieving a KEK associated with the KEK label from a key store, providing the KEK to a storage management subsystem (SMS), reading an encrypted DEK from metadata of the data set, decrypting the DEK using the KEK, then decrypting the data set using the decrypted DEK, etc.). These solutions are not abstract and cannot be performed as a set of mental acts by a human due to the processing capabilities needed to facilitate encryption key generation, for example. Further, some of the processes performed may be performed by a specialized computer for carrying out defined tasks related to memory operations. For example, a specialized computer can be employed to carry out tasks related to generating encryption keys, or the like.

Data set level encryption refers to policy-based, application-transparent encryption of data stored in data sets. Typically, cryptographic key officers are responsible for creating and maintaining keys within an enterprise organization. They generate DEKs that are persistently stored in key stores identified by unique key labels. To enable data set level encryption for a set of data sets, a key label may be added to a security policy associated with the data sets intended to be encrypted. To control access to data in the clear, security administrators may grant data owner's permission to the data set as well as the data set DEK label associated with that data set. To restrict access to data in the clear, security administrators may only grant storage administrators permission to the data set but not to the DEK label associated with that data set. When data owners, with permission to the data set and the DEK label, write to or read from the data set, the data is encrypted or decrypted using the DEK. Storage administrators, with permission to the data set only, can allocate and manage the data sets, but without permission to the DEK label, cannot write to or read from the data sets and thus cannot access data in the clear.

The amount of data that organizations encrypt continues to grow as data breaches become more prevalent. With data set level encryption, the process of allocating a new encrypted data set typically requires an application outage. The process to re-encrypt an existing encrypted data set with a new DEK typically requires an additional application outage. Based on the frequency required to re-encrypt a data set with a new DEK, as defined in a security policy, the number of outages may impact day-to-day business operations.

The typical process to re-encrypt a data set with a new DEK, also called a rekey operation, includes numerous steps. In this example, the DEK label is supplied to the storage management subsystem (SMS) through a data set security policy defined by a security administrator which can be validated by a system authorization facility (SAF). Similar steps would be needed regardless of how the DEK label is supplied to the system. This process involves at least 8 steps: generate a new DEK with a new key label, locate all data set security policies associated with the old DEK label, update the aforementioned data set security policies with the new DEK label, identify all data sets encrypted with the old DEK label, allocate new data sets associated with the newly updated data set security policy, copy the data from the old data sets to the new data sets, delete the old data sets, and archive or set an expiration date for the old DEK.

Aspects of the invention disclose methods, systems and computer readable media associated with improving the ability to rotate data encryption keys (DEKs) by enabling the operating system, at first data set open time, to generate a unique DEK which is encrypted with a key encrypting key (KEK) and then stored in the metadata of the data set it encrypts. This process entails the security administrator specifying a KEK label instead of a DEK label in a data set security policy. A system authorization facility (SAF) can subsequently validate the KEK label as well as a user's authorization to access the KEK label.

The data owner or storage administrator allocates a data set associated with that data set security policy. The SAF validates the user's authorization to the data set as well as the KEK label and retrieves the KEK label from the associated data set security policy. The disclosed methods then store the retrieved KEK label in the metadata of the data set. When the data owner opens the newly allocated data set for first time write, the SMS invokes SAF to validate the user's authorization to the KEK label, retrieves the KEK from the key store, generates a unique DEK, encrypts the DEK using the KEK and stores the encrypted DEK in the metadata of the data set. The method then encrypts the data set using the DEK. Encryption includes writing the encrypted data in the space allocated for the data set.

Aspects of the invention disclose methods, systems and computer readable media associated with enabling the ability to read encrypted data sets by opening an encrypted data set, retrieving a KEK associated with the KEK label from a key store according to the KEK label, retrieving an encrypted data encryption key (DEK) from data set metadata, decrypting the DEK using the KEK, decrypting the data set using the DEK, and providing the user access to the data set data.

To complete a data set rekey operation, the data owner simply copies the data from an old encrypted data set to the new data set which transparently encrypts the data with the newly generated DEK. The end result is that new data set is encrypted with a new DEK where both the KEK label and the encrypted DEK are stored in the metadata of the new data set. The DEK is unique to that data set and is never stored outside of the data set metadata.

Aspects of the invention disclose methods, systems and computer readable media associated with improving the ability to copy encrypted data sets by allocating a target data set associated with the security policy, retrieving the KEK label from the security policy, storing the KEK label as target data set metadata, opening the target data set for a first time write, generating a target data set data encryption key (DEK), retrieving a KEK from a key store according to the KEK label, encrypting the target data set DEK using the KEK, storing the encrypted DEK as target data set metadata; and encrypting source data set as the target data set using the target data set DEK.

A typical rekeying, or key rotation, process may include steps to generate a new data encryption key (DEK) with a new DEK label, locate all data set security policies associated with the old DEK label, update the data set security policy with the new DEK label, identify all data sets encrypted with the old DEK label, allocate new data sets associated with the newly updated data set security policies, copy the data from the old data sets to the new data sets, delete the old data sets, and archive or set an expiration date for the old DEK. The process represents significant burden to coordinating the rotating or rekeying of all data sets encrypted using a single DEK. The disclosed methods and programs provide a simplified process to rekey data sets and to enable staggered rekeying of data sets across the set of encrypted data sets.

In an embodiment, defining or allocating resources for a new data set includes referencing a data set security policy that contains a key encryption key (KEK) label rather than a data encryption key (DEK) label for the data set. The KEK label refers to a KEK stored in a cryptographic key store. In this embodiment, at first time open of a data set, the method retrieves the KEK label from the data set security policy and stores the KEK label as data set metadata. The method generates a unique DEK for the data set. The method retrieves the KEK from the key store using the KEK label, encrypts the DEK using the KEK, and stores the encrypted DEK in the metadata of the data set. The method encrypts the data set using the DEK and writes the encrypted data set in the allocated storage location.

In an embodiment, copying an existing encrypted data set includes accessing an existing source data set for a data read operation and an initial access to a newly allocated target data set for a data write operation. In this embodiment, the newly allocated target data set is associated with the same data set security policy as the source data set and utilizes the same KEK label as the source data set. Opening the existing source data set for a read operation results in the retrieval of the KEK from the key store, using the KEK label stored in the metadata of the source data set, decryption of the encrypted DEK stored in the metadata of the source data set using the KEK, and decryption of the data from the source data set using the DEK. Opening the newly allocated target data set for a write (copy) operation results in retrieval of the KEK from the key store using the KEK label stored in the metadata of the target data set, generation of a unique DEK for the target data set, encryption of the DEK using the KEK, storage of the encrypted DEK in the metadata of the target data set, encryption of the data from the source data set using the newly generated DEK from the target data set, and writing the newly encrypted data in the target data set. Copying an existing encrypted source data set effectively rekeys the data set, by the generation and use of a new DEK for the target data set, without any need to alter the data set security policy, KEK label, or key store.

In an embodiment, rekeying existing encrypted data sets according to a data set security policy requires only the allocation of a new data set according to the policy, copying the existing data set to the new data set—including the generation of a new DEK for the new data set, encrypting the new DEK using the KEK associated with the KEK label stored in the metadata of the data set, storing the encrypted DEK as new data set metadata, then encrypting and writing the new data set using the DEK. In an embodiment, deletion of the old data set after copying completes the rekeying process.

Encryption of each data set utilizes a unique DEK encrypted by a KEK. A single KEK may be utilized across a set of data sets as a shared KEK. The combination of unique DEK and shared KEK enables staggered rekeying of data sets as each rekeyed data set acquires a new unique DEK without a new KEK, eliminating any need to rekey all data sets at one time and the accompanying system disruptions associated with mass rekeying of data sets.

In an embodiment, a system authorization facility (SAF) includes a defined system level data set security policy—which indicates if a key label in the data set security policy should be treated as a KEK label or a DEK label. On a newly allocated data set, a key label is read from the data set security policy and stored in the data set metadata (e.g. an encryption cell) along with an indicator to designate the key label as a KEK label or a DEK label.

In an embodiment, a user (storage administrator) may be authorized access to data sets but not the associated KEK labels, enabling the storage administrator to manipulate data sets as needed without enabling access to the actual data set data. In an embodiment, a data set user may have access to a KEK label and associated KEK but not have access to all the data sets associated with the KEK label and KEK. As each KEK and KEK label may be reused across multiple data sets, validated user authorization to a KEK label is necessary but not sufficient to enable the user to access the data set data. Only a user having validated authorization to the data set and the KEK label has access to the underlying data set data. In this embodiment, the method validates each user for authorization to each of the relevant data sets and associated KEK labels.

In an embodiment, a data set-1 protected by KEK-1 associated with KEK-1 label and encrypted with DEK-1, may be rekeyed—undergo encryption key rotation—through the following steps:
  a. allocate a new data set-2 associated with KEK-1 and KEK-1 label according to the data set security policy of data set-1;
  b. open the new data set-2, resulting in the generation of DEK-2;
  c. encrypt DEK-2 using KEK-1. DEK-2 and KEK-1 label are stored as encryption metadata with data set-2; and
  d. copy the data from the source data set to the new data set—DEK-1 is decrypted using KEK-1 associated with KEK-1 label. The data of data set-1 is decrypted using DEK-1 and then encrypted using DEK-2.

The example includes appropriate steps by the SMS for the validation of user authorization for access to the data set and KEK-1 label.

As used herein, the SAF (system authorization facility), key store, SMS (storage management subsystem), KEK (key encryption key), DEK (data encryption key), and cryptographic provider comprise software modules of a computing environment utilized by the disclosed encryption rekeying methods. The CFHE (cryptographic function hardware engine) comprises a hardware engine of the computing environment called to perform cryptographic functions in support of the disclosed rekeying methods.

FIG. 1 provides a functional block diagram illustrating the relationship between various system components of the disclosed embodiments. As shown in the figure, the SMS 12 receives user data set requests 10. After receiving the user data set requests 10, SMS 12 opens an allocated and existing data set and scans the metadata of the data set for encryption key information (a KEK label).

In an embodiment, for a new data set, SMS allocates the data set according to a defined security policy for the data set. The security policy includes any KEK label assigned to the data set, and a listing of users authorized to access the data set. The SAF also maintains listing of users authorized to access each KEK label. In allocating the data set, the SMS saves the data set KEK label as part of the data set's encryption metadata.

The SMS 12 queries the SAF 14, for the data set security policy to validate the requesting user's authorization to access the data set and the associated KEK label. After validation of user authorization to the data set and associated KEK label, SMS 12, passes the KEK label from the data set metadata to the cryptographic provider 16. The cryptographic provider 16, looks up a KEK in the key store 18, using the KEK label. In an embodiment, the cryptographic provider 16, passes the KEK to SMS 12.

In an embodiment, for new data sets, SMS 12, calls the cryptographic provider 16, to generate a DEK for the data set, encrypt the DEK using the KEK, encrypt and write data to the data set using the DEK. The SMS stores the encrypted DEK as metadata in an encryption cell associated with the allocated data set.

For existing data sets, the SMS 12, validates the requesting user's access to the data set and KEK label, and calls the cryptographic provider 16 to use the KEK to decrypt the data set's DEK, then to decrypt the data of the data set for access by the user 10, using the DEK. In an embodiment, SMS 12 calls CFHE 20 to decrypt the data set using the decrypted DEK.

Figure 2:
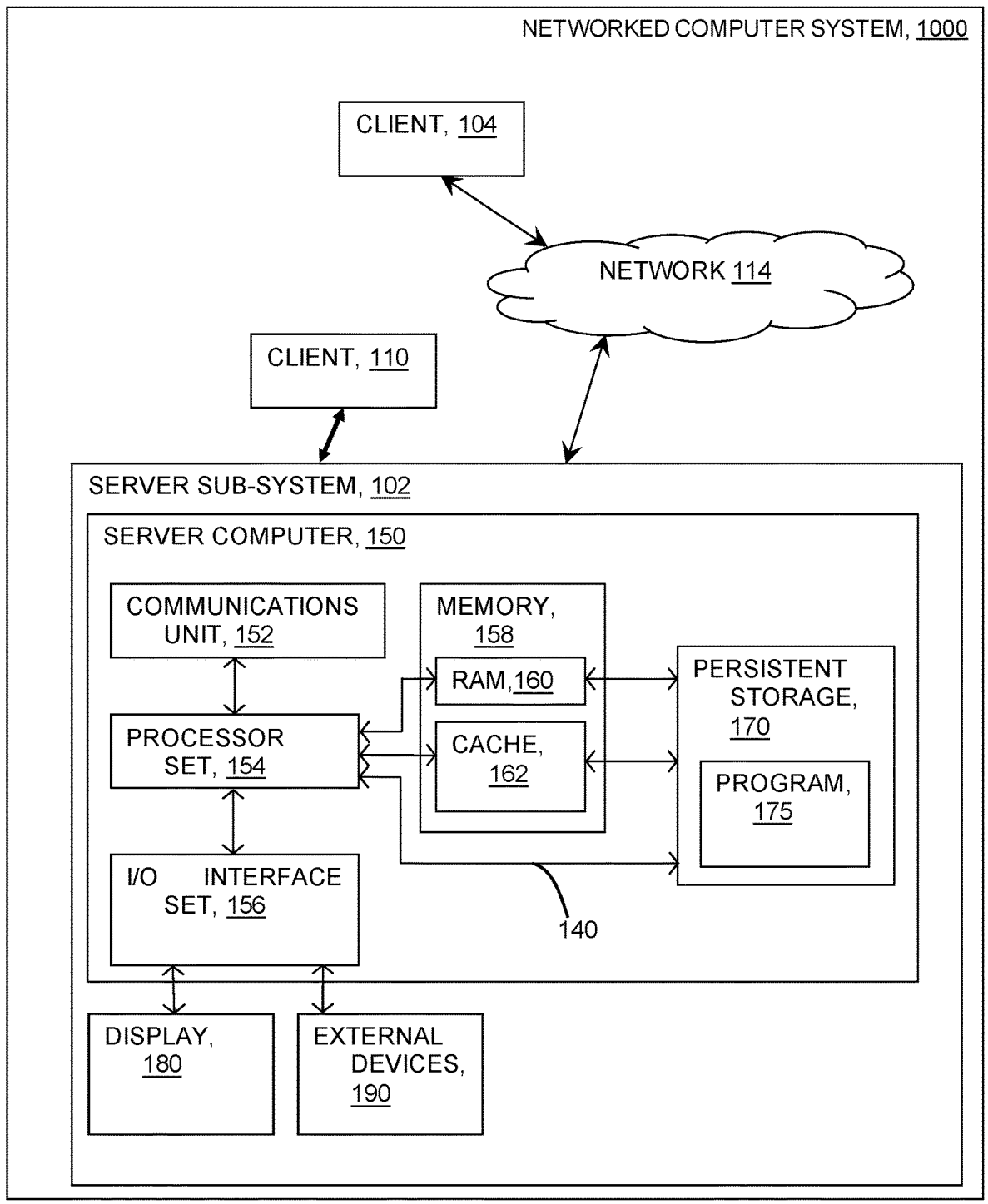
FIG. 2 provides a schematic illustration of a system, according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise data set encryption rekeying program (not shown) together with sufficient computing resource (processor, memory, network communications hardware) to execute the program. As shown in FIG. 2, server sub-system 102 comprises a server computer 150. FIG. 2 depicts a block diagram of components of server computer 150 within a networked computer system 1000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Processors 154 may include a CFHE (not shown) for the performance of dedicated cryptographic functions. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the encryption program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., encryption program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 3:
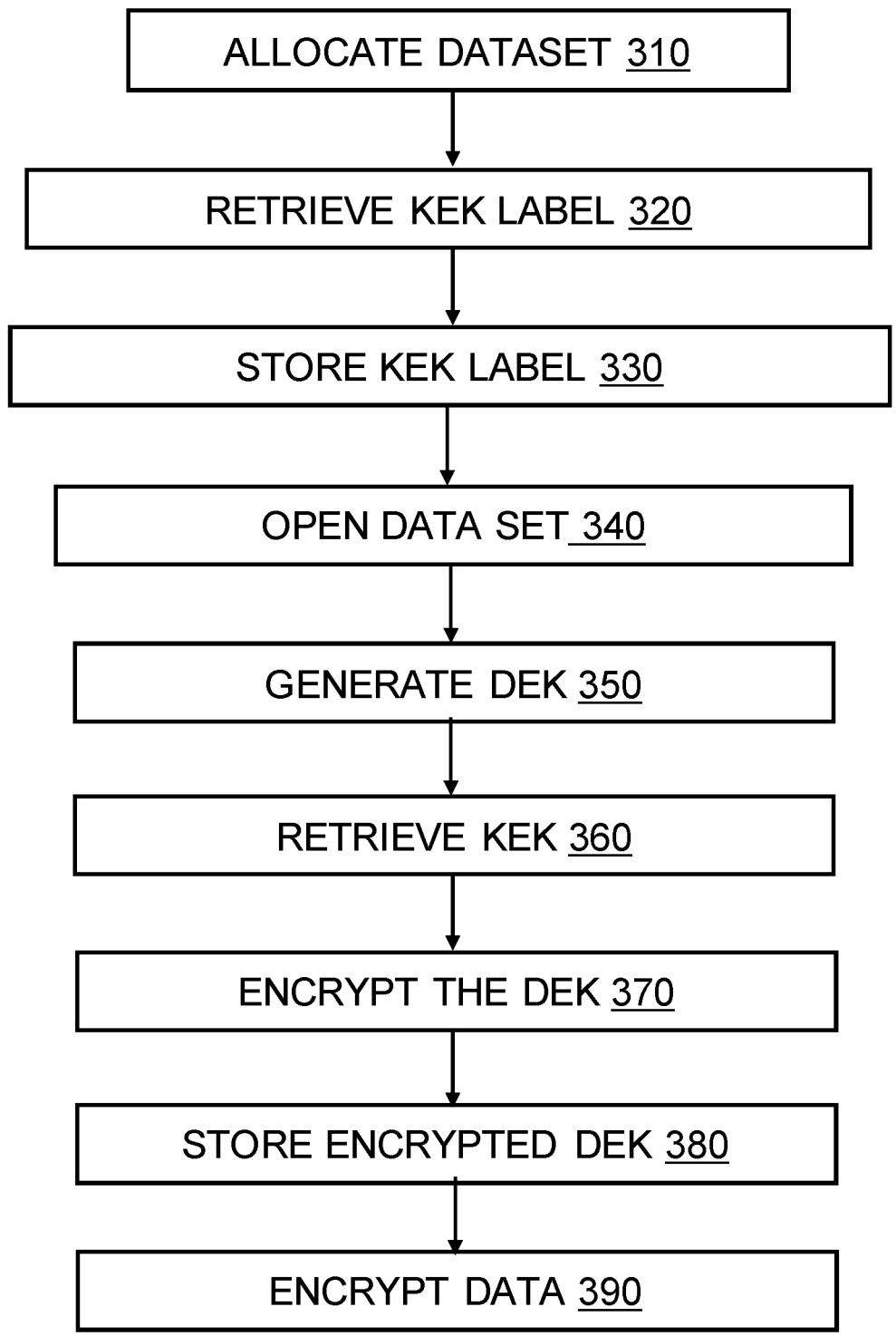
FIG. 3 provides a flowchart depicting an operational key generation sequence, according to an embodiment of the invention.

FIG. 3 provides a flowchart 300, illustrating exemplary operational steps for creating a new data set according to an embodiment of the invention. According to flowchart 300, at block 310 the method of encryption program 175 allocates a new data set after a user request using the parameters associated with the data set security policy including the use of a KEK label for the data set and the KEK label itself. At block 320, the method retrieves the KEK label from the data set security policy and at block 330, the method stores the KEK label as encryption metadata for the data set.

At block 340, the method opens the newly allocated data set for a first time write of data to the data set. In conjunction with opening the data set for the first time write, at block 350 the method generates—or has generated by a cryptographic provider, a DEK specific to the data set.

At block 360 the method retrieves a KEK from a key store according to the KEK label of the data set. At block 370, the method encrypts the data set DEK using the retrieved KEK or has the cryptographic provider encrypt the DEK using the KEK. The method retains the DEK in volatile memory for encrypting the data of the data set and stores the encrypted DEK as data set metadata in an encryption metadata cell of the data set at block 380. At block 390, the method utilizes the DEK in volatile memory to encrypt and write data to the allocated data set.

Figure 4:
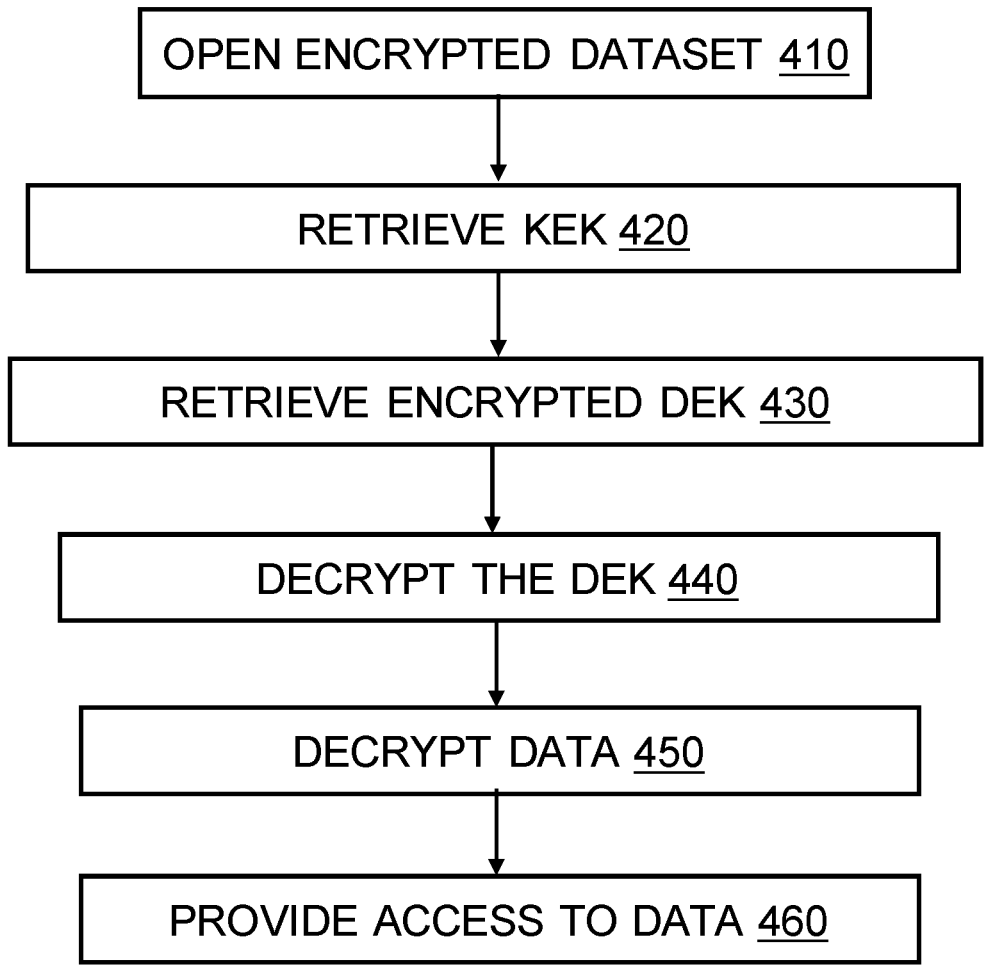
FIG. 4 provides a flowchart depicting an operational read sequence, according to an embodiment of the invention.

FIG. 4 provides a flowchart 400, illustrating exemplary activities associated with the practice of the disclosure. At block 410, a storage management system (SMS) receives a user request and opens an encrypted data set. After opening the data set, at block 420, the SMS retrieves a key encryption key (KEK) label found in the metadata of the data set. The SMS may request validation of the user's authorization to access the data set and the KEK label, according to the SAF policies.

At block 430 the SMS passes the KEK label associated with the data set to a cryptographic provider to retrieve the KEK associated with the data set through the KEK label. The cryptographic provider looks up the KEK associated with the KEK label in a key store and passes the KEK to the SMS.

At block 440, the SMS retrieves an encrypted DEK from the metadata of the open data set and decrypts the DEK using the KEK. In an embodiment, the SMS uses the KEK to decrypt the DEK from the data set metadata.

At block 450, the method of encryption program 175 decrypts the data set using the DEK. In an embodiment, the SMS calls the CFHE to decrypt the data set using the DEK. At block 460, the method provides the user access to the decrypted data of the data set. The KEK label and encrypted DEK remain in the metadata of the encrypted data set.

In an embodiment, after data sets have been initially encrypted using a DEK, with the DEK encrypted using a KEK, rekeying—rotating—changing—the encryption key of a data set requires only copying the encrypted data set from its current data set allocation to a new data set allocation having the same KEK label. During the copying execution, generation of a new DEK for the newly allocated data set occurs with the initial write access of the data set for making the copy, resulting in the copy being encrypted using a new DEK, while still being accessed using the original KEK. Alternatively, the new data set SAF profile may include a new KEK label yielding a copy of the source data set encrypted with a new DEK, the new DEK further encrypted using the new KEK.

Figure 5:
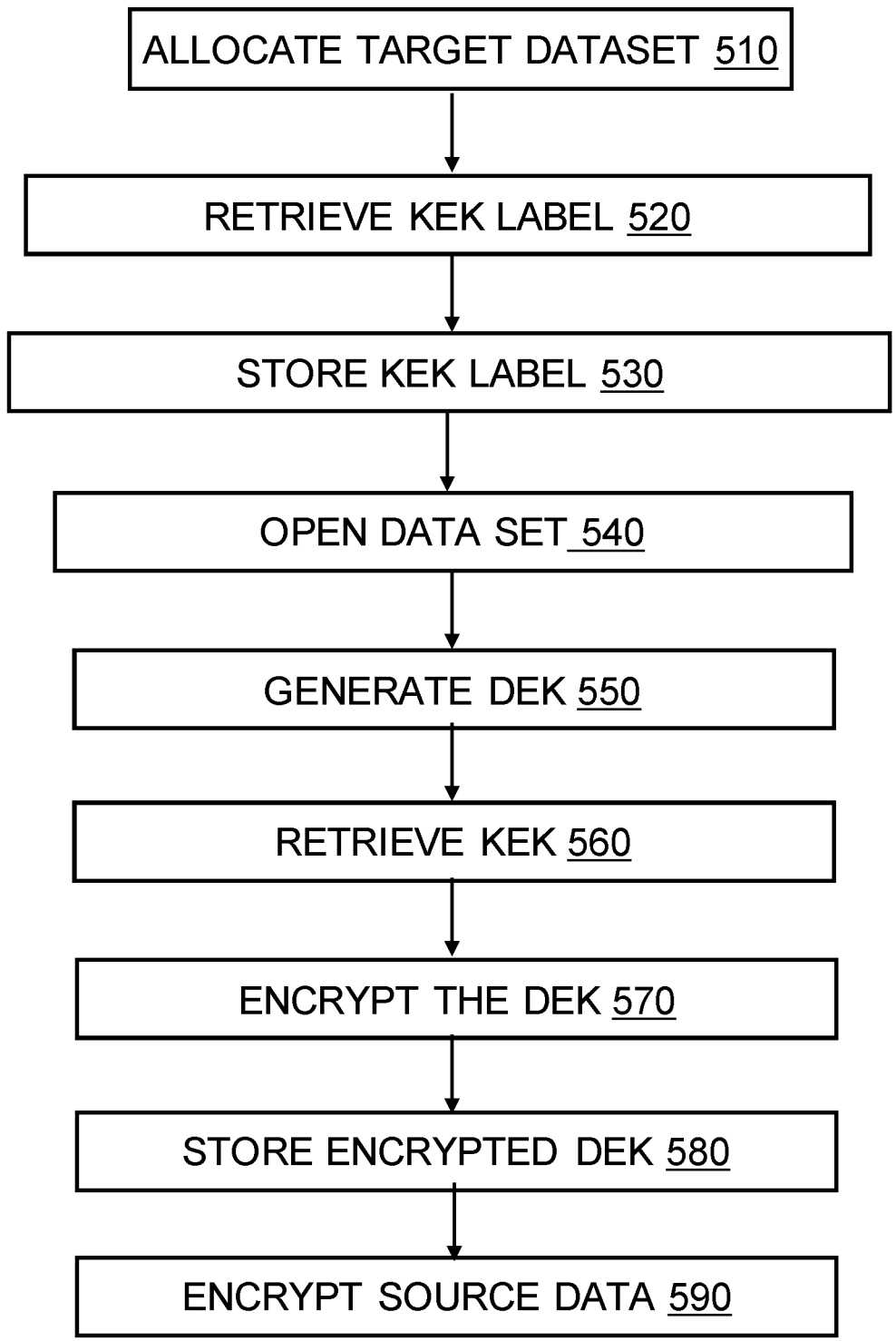
FIG. 5 provides a flowchart depicting the target of an operational data set rekeying operation where the read sequence of the source is identified by FIG. 4, according to an embodiment of the invention.

Flowchart 500 of FIG. 5 illustrates exemplary operational steps of encryption program 175 during the copying and rekeying of a data set. At block 510 the method of encryption program 175 allocates a target data set after a user request to copy a source data set using the parameters associated with the target data set security policy including the use of a KEK label for the data set and the KEK label itself. The data set security policy of the source data set, including the KEK label of the source data set, are utilized for the target data set. At block 520, the method retrieves the KEK label from the target data set security policy and at block 530, the method stores the KEK label as encryption metadata for the target data set.

At block 540, the method opens the allocated target data set for a first time write of source data to the target data set. In conjunction with opening the target data set for the first time write, at block 550 the method generates—or has generated by a cryptographic provider, a DEK specific to the target data set.

At block 560 the method retrieves a KEK from a key store according to the KEK label of the target data set. At block 570, the method encrypts the target data set DEK using the retrieved KEK. The method retains the target data set DEK in volatile memory for encrypting the data of the data set and stores the encrypted target data set DEK as target data set metadata in an encryption metadata cell of the target data set at block 580. The method of encryption program 175 follows the operational steps set forth in FIG. 4 and described above to open, decrypt and read the data of the source data set. At block 590, the method utilizes the DEK in volatile memory to encrypt and write data from the source data set to the allocated target data set. In an embodiment, the method follows the encryption and writing of the source data to the target data set by deleting the source data set from persistent memory (not shown).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
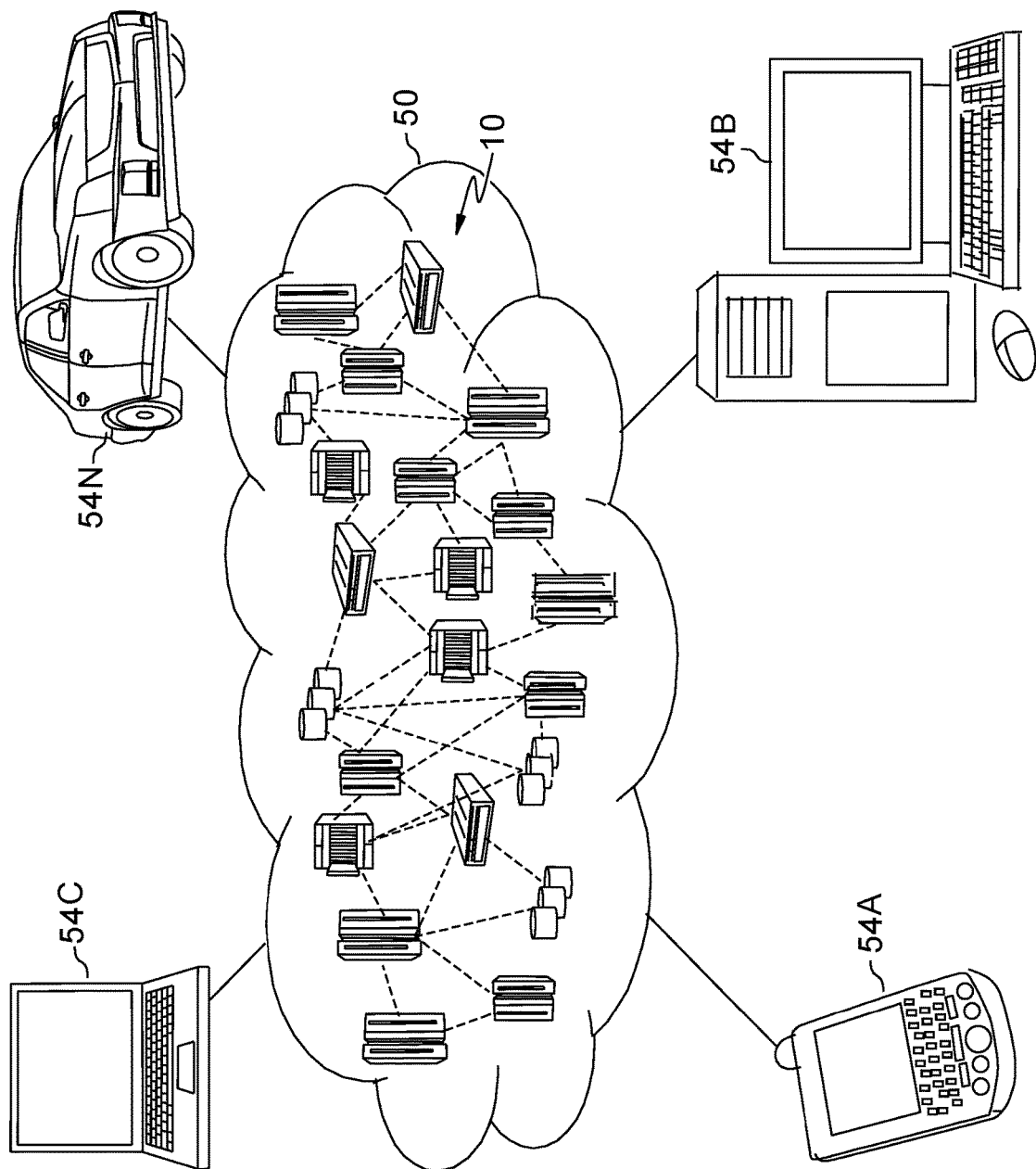
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
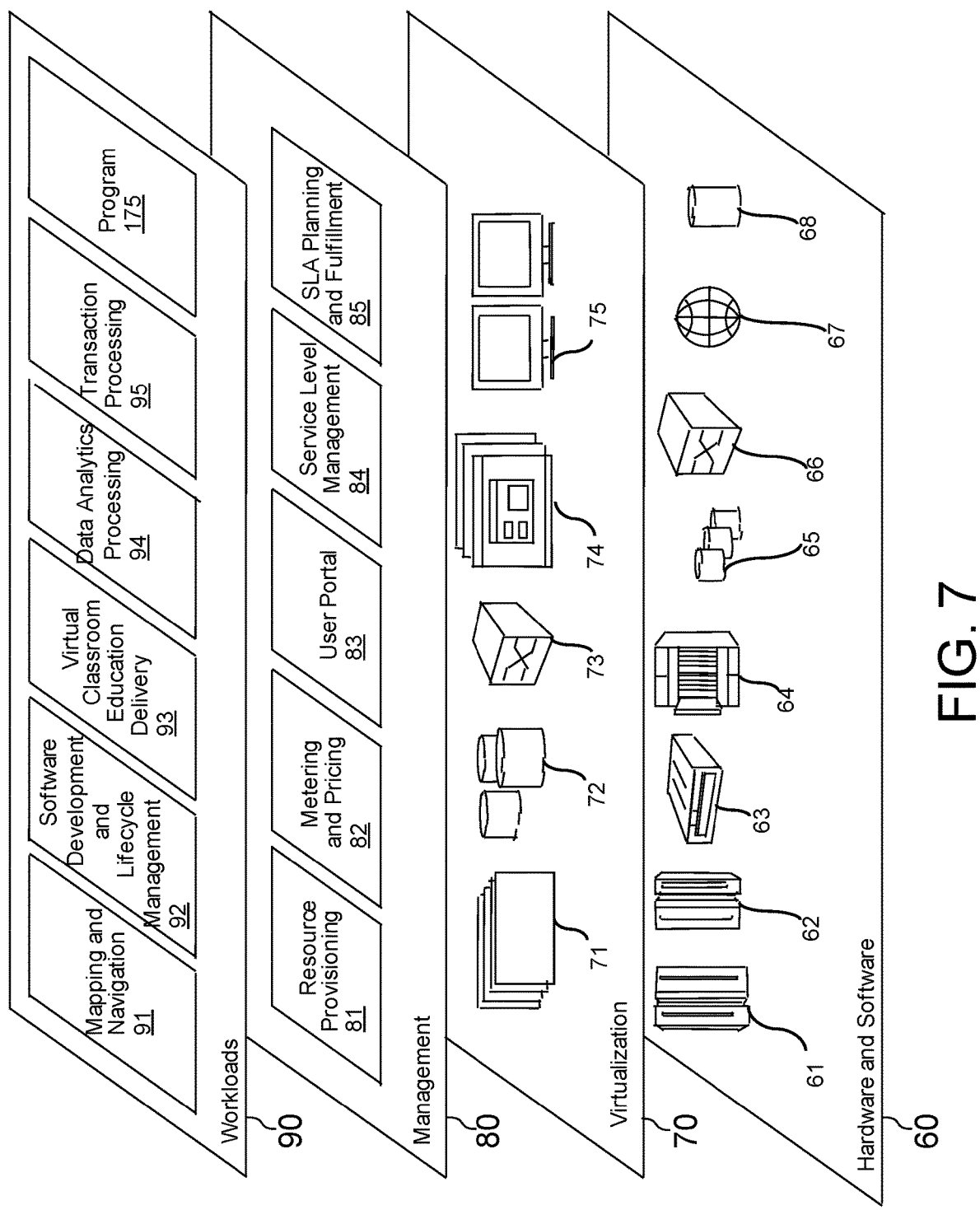
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating unique keys for a data set, the method comprising:
    allocating, by one or more computer processors, resources for a data set associated with a security policy, wherein the security policy specifies a key encryption key (KEK) label;
    retrieving, by the one or more computer processors, the KEK label from the security policy;
    storing, by the one or more computer processors, the KEK label as metadata of the data set;
    opening, by the one or more computer processors, the data set for a first time write;
    generating, by the one or more computer processors, a data encryption key (DEK);
    retrieving, by the one or more computer processors, a KEK from a key store according to the KEK label;
    encrypting, by the one or more computer processors, the DEK using the KEK;
    storing, by the one or more computer processors, the encrypted DEK as metadata of the data set;
    encrypting, by the one or more computer processors, the data set using the DEK; and
    writing the encrypted data set to the allocated resources.

2. The computer implemented method according to claim 1, further comprising
    opening, by the one or more computer processors, the encrypted data set;
    retrieving, by the one or more computer processors, the KEK from the key store according to the KEK label of the encrypted data set;
    retrieving, by the one or more computer processors, the encrypted DEK from metadata of the encrypted data set;
    decrypting, by the one or more computer processors, the encrypted DEK using the KEK;
    decrypting, by the one or more computer processors, the encrypted data set using the DEK; and
    providing, by the one or more computer processors, a user access to the data set data.

3. The computer implemented method according to claim 1, further comprising:
    allocating, by the one or more computer processors, a target data set associated with the security policy;

retrieving, by the one or more computer processors, the KEK label from the security policy;

storing, by the one or more computer processors, the KEK label as metadata of the target data set;

opening, by the one or more computer processors, the target data set for a first time write;

generating, by the one or more computer processors, a target data set DEK;

retrieving, by the one or more computer processors, the KEK from the key store according to the KEK label;

encrypting, by the one or more computer processors, the target data set DEK using the KEK;

storing, by the one or more computer processors, the encrypted DEK as metadata of the target data set; and encrypting, by the one or more computer processors, a source data set as the target data set using the target data set DEK.

4. The computer implemented method according to claim 3, further comprising deleting the source data.

5. The computer implemented method according to claim 1, further comprising validating a user's access to the allocated data set.

6. The computer implemented method according to claim 1, further comprising validating a user's access to the KEK label.

7. The computer implemented method according to claim 1, further comprising:

opening, by the one or more computer processors, an encrypted source data set;

retrieving, by the one or more computer processors, the KEK associated with the KEK label from the key store according to the KEK label;

retrieving, by the one or more computer processors, the encrypted DEK from data set metadata;

decrypting, by the one or more computer processors, the encrypted DEK using the KEK;

decrypting, by the one or more computer processors, the encrypted source data set using the DEK;

allocating, by the one or more computer processors, a target data set associated with the security policy;

retrieving, by the one or more computer processors, the KEK label from the security policy;

storing, by the one or more computer processors, the KEK label as metadata of the target data set;

opening, by the one or more computer processors, the target data set for a first time write;

generating, by the one or more computer processors, a target data set DEK;

retrieving, by the one or more computer processors, a KEK from the key store according to the KEK label;

encrypting, by the one or more computer processors, the target data set DEK using the KEK;

storing, by the one or more computer processors, the encrypted DEK as target data set metadata; and encrypting, by the one or more computer processors, the source data set data as the target data set using the target data set DEK.

8. A computer program product for generating unique keys for a data set, the computer program product comprising one or more computer readable storage devices and program instructions collectively stored on the one or more computer readable storage devices, the stored program instructions comprising:

program instructions to allocate resources for a data set associated with a security policy, wherein the security policy specifies a key encryption key (KEK) label;

program instructions to retrieve the KEK label from the security policy;

program instructions to store the KEK label metadata of the as data set;

program instructions to open the data set for a first time write;

program instructions to generate a data encryption key (DEK);

program instructions to retrieve a KEK from a key store according to the KEK label;

program instructions to encrypt the DEK using the KEK;

program instructions to store the encrypted DEK as metadata of the data set;

program instructions to encrypt the data set using the DEK; and program instructions to write the encrypted data set to the allocated resources.

9. The computer program product according to claim 8, the stored program instructions further comprising:

program instructions to open an encrypted data set;

program instructions to retrieve the KEK from the key store according to the KEK label of the encrypted data set;

program instructions to retrieve the encrypted DEK from metadata of the encrypted data set;

program instructions to decrypt the encrypted DEK using the KEK;

program instructions to decrypt the encrypted data set using the DEK; and program instructions to provide the user access to the data set data.

10. The computer program product according to claim 8, the stored program instructions further comprising:

program instructions to allocate a target data set associated with the security policy;

program instructions to retrieve the KEK label from the security policy;

program instructions to store the KEK label as metadata of the target data set;

program instructions to open the target data set for a first time write;

program instructions to generate a target data set DEK;

program instructions to retrieve the KEK from the key store according to the KEK label;

program instructions to encrypt the target data set DEK using the KEK;

program instructions to store the encrypted DEK as metadata of the target data set; and program instructions to encrypt source data set as the target data set using the target data set DEK.

11. The computer program product according to claim 10, the stored program instructions further comprising program instructions to delete the source data.

12. The computer program product according to claim 8, the stored program instructions further comprising program instructions to validate a user's access to the allocated data set.

13. The computer program product according to claim 8, the stored program instructions further comprising program instructions to validate a user's access to the KEK label.

14. The computer program product according to claim 8, the stored program instructions further comprising:

program instructions to open the encrypted source data set;

program instructions to retrieve the KEK associated with the KEK label from the key store according to the KEK label;

program instructions to retrieve the DEK from encrypted source data set metadata;
program instructions to decrypt the DEK using the KEK;
program instructions to decrypt the encrypted source data set using the DEK;
program instructions to allocate a target data set associated with the security policy;
program instructions to retrieve the KEK label from the security policy;
program instructions to store the KEK label as metadata of the target data set;
program instructions to open the target data set for a first time write;
program instructions to generate a target data set DEK;
program instructions to retrieve the KEK from the key store according to the KEK label;
program instructions to encrypt the target data set DEK using the KEK;
program instructions to store the encrypted DEK as metadata of the target data set; and
program instructions to encrypt the source data set data as the target data set using the target data set DEK.

15. A computer system for generating unique keys for a data set, the computer system comprising:
one or more computer processors;
one or more computer readable storage devices; and
stored program instructions on the one or more computer readable storage devices for execution by the one or more computer processors, the stored program instructions comprising:
program instructions to allocate resources for a data set associated with a security policy, wherein the security policy specifies a key encryption key (KEK) label;
program instructions to retrieve the KEK label from the security policy;
program instructions to store the KEK label as metadata of the data set;
program instructions to open the data set for a first time write;
program instructions to generate a data encryption key (DEK);
program instructions to retrieve a KEK from a key store according to the KEK label;
program instructions to encrypt the DEK using the KEK;
program instructions to store the encrypted DEK as metadata of the data set;
program instructions to encrypt the data set using the DEK; and
program instructions to write the encrypted data set to the allocated resources.

16. The computer system according to claim 15, the stored program instructions further comprising:
program instructions to open the encrypted data set;
program instructions to retrieve the KEK from the key store according to the KEK label of the encrypted data set;
program instructions to retrieve the encrypted DEK from metadata of the encrypted data set;
program instructions to decrypt the encrypted DEK using the KEK;
program instructions to decrypt the encrypted data set using the DEK; and
program instructions to provide the user access to the data set data.

17. The computer system according to claim 15, the stored program instructions further comprising:
program instructions to allocate a target data set associated with the security policy;
program instructions to retrieve the KEK label from the security policy;
program instructions to store the KEK label as metadata of the target data set;
program instructions to open the target data set for a first time write;
program instructions to generate a target data set DEK;
program instructions to retrieve the KEK from the key store according to the KEK label;
program instructions to encrypt the target data set DEK using the KEK;
program instructions to store the encrypted DEK as metadata of the target data set; and
program instructions to encrypt source data set as the target data set using the target data set DEK.

18. The computer system according to claim 15, the stored program instructions further comprising program instructions to validate a user's access to the allocated data set.

19. The computer system according to claim 15, the stored program instructions further comprising program instructions to validate a user's access to a KEK label.

20. The computer system according to claim 15, the program instructions further comprising:
program instructions to open an encrypted source data set;
program instructions to retrieve the KEK associated with the KEK label from the key store according to the KEK label;
program instructions to retrieve the encrypted DEK from encrypted source data set metadata;
program instructions to decrypt the encrypted DEK using the KEK;
program instructions to decrypt the encrypted source data set using the DEK;
program instructions to allocate a target data set associated with the security policy;
program instructions to retrieve the KEK label from the security policy;
program instructions to store the KEK label as metadata of the target data set;
program instructions to open the target data set for a first time write;
program instructions to generate a target data set DEK;
program instructions to retrieve the KEK from the key store according to the KEK label;
program instructions to encrypt the target data set DEK using the KEK;
program instructions to store the encrypted DEK as metadata of the target data set; and
program instructions to encrypt the source data set data as the target data set using the target data set DEK.

* * * * *